(12) United States Patent
Stein et al.

(10) Patent No.: US 11,301,389 B2
(45) Date of Patent: Apr. 12, 2022

(54) EXECUTABLE MEMORY PAGE VALIDATION SYSTEM AND METHOD

(71) Applicant: SAFERIDE TECHNOLOGIES LTD., Tel Aviv-Jaffa (IL)

(72) Inventors: Yehiel Stein, Ramat Hasharon (IL); Yossi Vardi, Tel Aviv (IL); Oshri Yahav, Tel Aviv (IL)

(73) Assignee: SAFERIDE TECHNOLOGIES LTD., Tel Aviv (IL)

( * ) Notice: Subject to any disclaimer, the term of this patent is extended or adjusted under 35 U.S.C. 154(b) by 0 days.

(21) Appl. No.: 17/434,763

(22) PCT Filed: Feb. 27, 2020

(86) PCT No.: PCT/IL2020/050221
§ 371 (c)(1),
(2) Date: Aug. 30, 2021

(87) PCT Pub. No.: WO2020/178812
PCT Pub. Date: Sep. 10, 2020

(65) Prior Publication Data
US 2022/0043754 A1    Feb. 10, 2022

Related U.S. Application Data

(60) Provisional application No. 62/813,213, filed on Mar. 4, 2019.

(51) Int. Cl.
*G06F 12/0882* (2016.01)
*G06F 12/0871* (2016.01)
(Continued)

(52) U.S. Cl.
CPC ...... *G06F 12/0882* (2013.01); *G06F 12/0871* (2013.01); *G06F 12/0891* (2013.01);
(Continued)

(58) Field of Classification Search
CPC ............. G06F 12/0871; G06F 12/0882; G06F 12/0891; G06F 12/1408; G06F 2212/1024; G06F 2212/222
See application file for complete search history.

(56) References Cited

U.S. PATENT DOCUMENTS 7,984,304 B1    7/2011    Waldspurger et al.
8,971,538 B1    3/2015    Marr et al.
(Continued)

OTHER PUBLICATIONS

Batchelore et al, Data Execution Prevention, in Microsoft, May 31, 2018.

*Primary Examiner* — Aracelis Ruiz

(57) ABSTRACT

An executable memory page validation system for validating one or more executable memory pages on a given endpoint, the executable memory page validation system comprising at least one processing resource configured to: obtain a plurality of vectors, each vector of the vectors being a bitmask indicative of valid hash values calculated for a plurality of executable memory pages available on the endpoint, the valid hash values being calculated using a respective distinct hash function; calculate one or more validation hash values for a given executable memory page to be loaded to a computerized memory of the endpoint for execution thereof, using one or more selected hash functions of the distinct hash functions; and determine that the given executable memory page is invalid, upon one or more of the validation hash values not being indicated as valid in the corresponding one or more vectors.

20 Claims, 3 Drawing Sheets

(51) Int. Cl.
*G06F 12/14* (2006.01)
*G06F 12/0891* (2016.01)

(52) U.S. Cl.
CPC .. *G06F 12/1408* (2013.01); *G06F 2212/1024* (2013.01); *G06F 2212/222* (2013.01)

(56) References Cited

U.S. PATENT DOCUMENTS

| | | |
|---|---|---|
| 2003/0200405 A1 | 10/2003 | Willman et al. |
| 2013/0132690 A1 | 5/2013 | Epstein |
| 2014/0304515 A1* | 10/2014 | Feuerman ............. H04L 63/123 713/176 |
| 2019/0026466 A1 | 1/2019 | Krasser et al. |

* cited by examiner

EXECUTABLE MEMORY PAGE VALIDATION SYSTEM AND METHOD

TECHNICAL FIELD

The invention relates to an executable memory page validation system and method.

BACKGROUND

One of the main threats to computer systems is the injection of executable malicious code by an attacker into a process space of legitimate executables, thereby hiding the execution of the malicious code inside a seemingly innocent and legitimate system process. Executable malicious code can be injected into legitimate executable memory pages when the executable memory pages are in primary memory or being swapped out by the memory subsystem, etc. It is an object of the present disclosure to validate each executable memory page on an endpoint prior to the loading thereof into computerized memory to prevent executable memory pages that include malicious code from being executed. It is a further object of the present disclosure to perform this validation with a minimal processing overhead.

GENERAL DESCRIPTION

In accordance with a first aspect of the presently disclosed subject matter, there is provided an executable memory page validation system for validating one or more executable memory pages on a given endpoint, the executable memory page validation system comprising at least one processing resource configured to: obtain a plurality of vectors, each vector of the vectors being a bitmask indicative of valid hash values calculated for a plurality of executable memory pages available on the endpoint, the valid hash values being calculated using a respective distinct hash function; calculate one or more validation hash values for a given executable memory page to be loaded to a computerized memory of the endpoint for execution thereof, using one or more selected hash functions of the distinct hash functions; and determine that the given executable memory page is invalid, upon one or more of the validation hash values not being indicated as valid in the corresponding one or more vectors.

In some cases, the given executable memory page is to be loaded from a non-volatile memory.

In some cases, the given executable memory page is to be loaded from a cache memory.

In some cases, the plurality of executable memory pages are all of the executable memory pages available on the given endpoint.

In some cases, the at least one processing resource is further configured to hook into a paged memory management unit of the endpoint to detect, responsive to a page fault, that the given executable memory page is to be loaded.

In some cases, the hook is performed at an operating system level.

In some cases, the hook is performed at a hypervisor level.

In some cases, the hook is performed at a Unified Extensible Firmware Interface (UEFI) level.

In some cases, the one or more selected hash functions are randomly selected from among the distinct hash functions.

In some cases, the one or more selected hash functions are selected at a time of loading of an operating system on the endpoint.

In some cases, the one or more selected hash functions are selected when the given executable memory page is being prepared for loading.

In some cases, during the calculate, the at least one processing resource is configured to parse the given executable memory page only once for a parallel calculation of the selected hash functions when a plurality of selected hash functions are selected.

In some cases, the parse is performed by sequentially parsing one or more chunks of the given executable memory page and wherein the selected hash functions are incremental hash functions.

In some cases, upon determining that the given executable memory page is invalid, the at least one processing resource is configured to alert a user of the endpoint.

In some cases, upon determining that the given executable memory page is invalid, the at least one processing resource is configured to modify the given executable memory page.

In some cases, upon determining that the given executable memory page is invalid, the at least one processing resource is configured to stop a process associated with the given executable memory page from executing.

In accordance with a second aspect of the presently disclosed subject matter, there is provided an executable memory page validation method for validating one or more executable memory pages on a given endpoint, the executable memory page validation method comprising: obtaining a plurality of vectors, each vector of the vectors being a bitmask indicative of valid hash values calculated for a plurality of executable memory pages available on the endpoint, the valid hash values being calculated using a respective distinct hash function; calculating one or more validation hash values for a given executable memory page to be loaded to a computerized memory of the endpoint for execution thereof, using one or more selected hash functions of the distinct hash functions; and determining that the given executable memory page is invalid, upon one or more of the validation hash values not being indicated as valid in the corresponding one or more vectors.

In some cases, the given executable memory page is to be loaded from a non-volatile memory.

In some cases, the given executable memory page is to be loaded from a cache memory.

In some cases, the plurality of executable memory pages are all of the executable memory pages available on the given endpoint.

In some cases, the executable memory page validation method further comprises: hooking into a paged memory management unit of the endpoint to detect, responsive to a page fault, that the given executable memory page is to be loaded.

In some cases, the hooking is performed at an operating system level.

In some cases, the hooking is performed at a hypervisor level.

In some cases, the hooking is performed at a Unified Extensible Firmware Interface (UEFI) level.

In some cases, the one or more selected hash functions are randomly selected from among the distinct hash functions.

In some cases, the one or more selected hash functions are selected at a time of loading of an operating system on the endpoint.

In some cases, the one or more selected hash functions are selected when the given executable memory page is being prepared for loading.

In some cases, the calculating further comprises: parsing the given executable memory page only once for a parallel calculation of the selected hash functions when a plurality of selected hash functions are selected.

In some cases, the parsing is performed by sequentially parsing one or more chunks of the given executable memory page and wherein the selected hash functions are incremental hash functions.

In some cases, upon determining that the given executable memory page is invalid, the method further comprises: alerting a user of the endpoint.

In some cases, upon determining that the given executable memory page is invalid, the method further comprises: modifying the given executable memory page.

In some cases, upon determining that the given executable memory page is invalid, the method further comprises: stopping a process associated with the given executable memory page from executing.

In accordance with a third aspect of the presently disclosed subject matter, there is provided a non-transitory computer readable storage medium having computer readable program code embodied therewith, the computer readable program code, executable by at least one processor of a computer to perform an executable memory page validation method for validating one or more executable memory pages on a given endpoint comprising:

obtaining a plurality of vectors, each vector of the vectors being a bitmask indicative of valid hash values calculated for a plurality of executable memory pages available on the endpoint, the valid hash values being calculated using a respective distinct hash function; calculating one or more validation hash values for a given executable memory page to be loaded to a computerized memory of the endpoint for execution thereof, using one or more selected hash functions of the distinct hash functions; and determining that the given executable memory page is invalid, upon one or more of the validation hash values not being indicated as valid in the corresponding one or more vectors.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
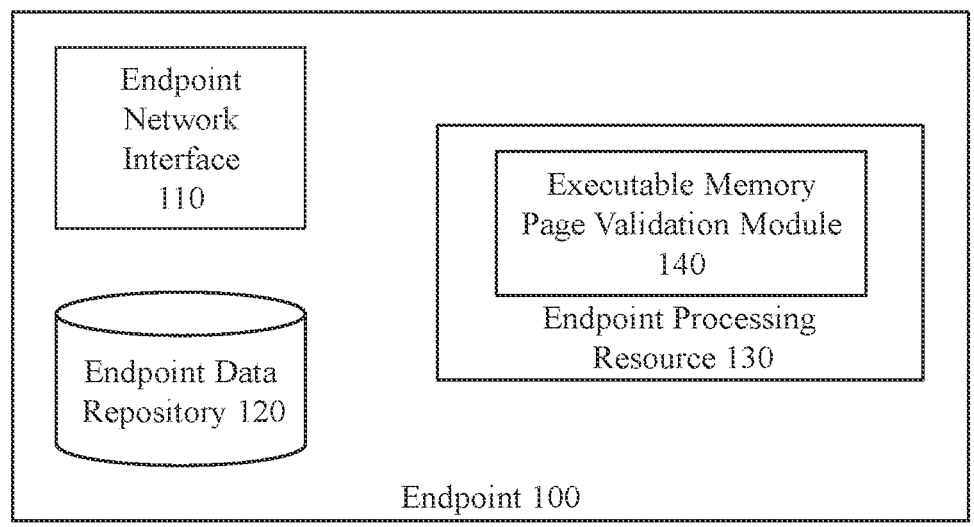
FIG. 1 is a block diagram schematically illustrating one example of an endpoint, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "calculating", "determining", "loading", "hooking", "selecting", "parsing", "alerting", "modifying", "stopping" or the like, include actions and/or processes, including, inter alia, actions and/or processes of a computer, that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field-programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
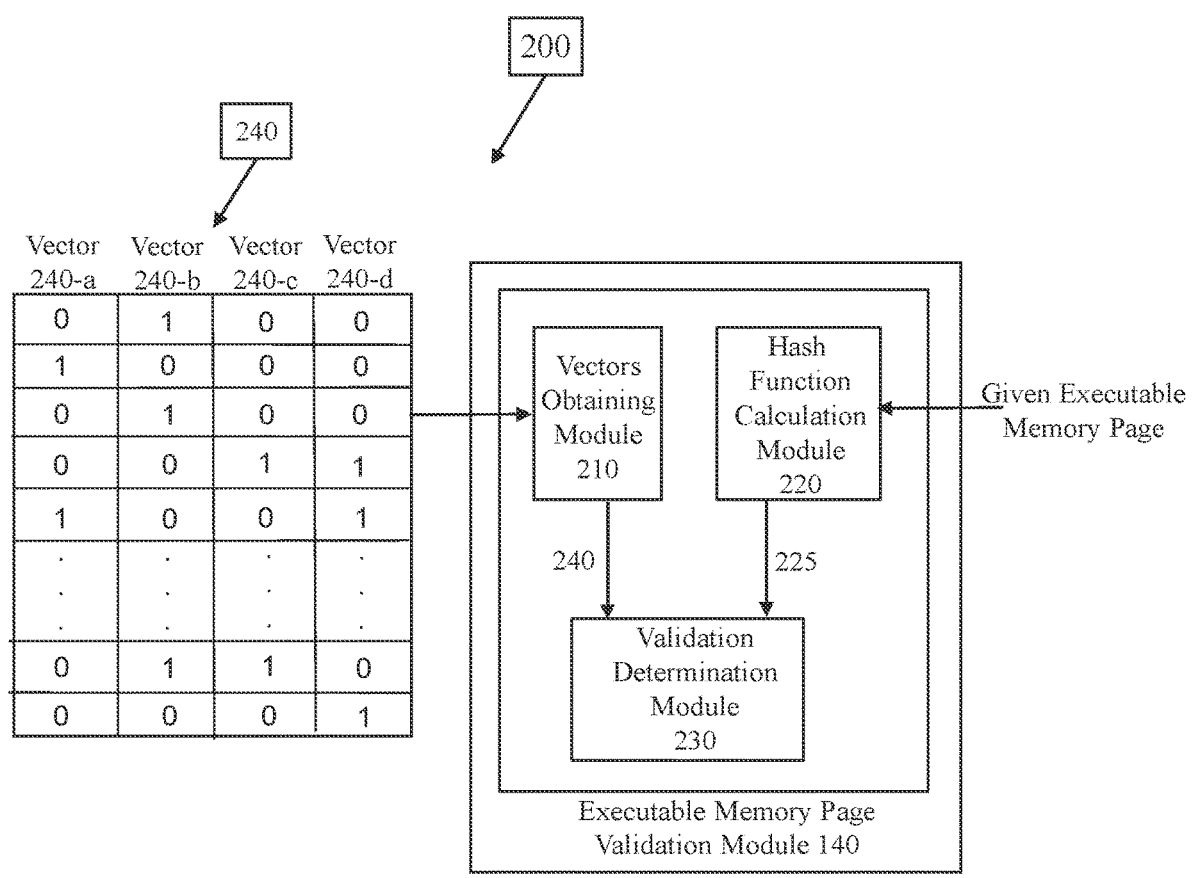
FIG. 2 is a schematic illustration of an executable memory page validation system for validating one or more executable memory pages on an endpoint, in accordance with the presently disclosed subject matter.
Figure 3:
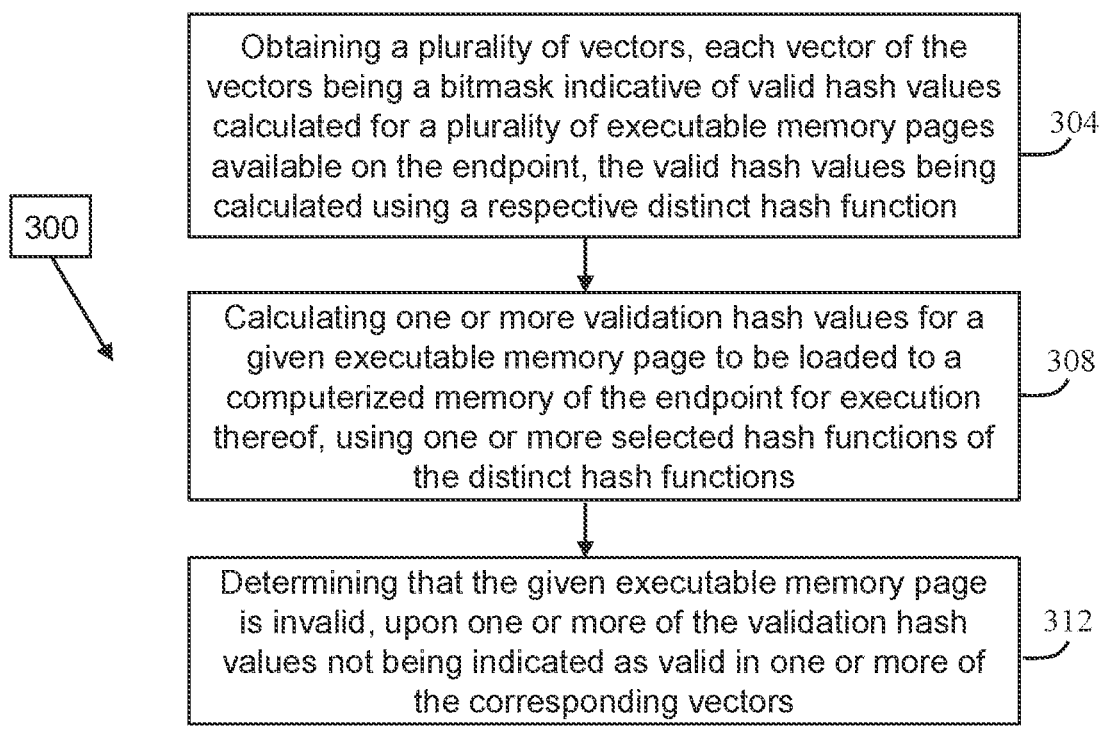
FIG. 3 is a flowchart illustrating one example of a sequence of operations performed on an endpoint for validating a given executable memory page, in accordance with the presently disclosed subject matter.

In embodiments of the presently disclosed subject matter, fewer, more and/or different stages than those shown in FIG. 3 may be executed. FIGS. 1 and 2 illustrate general schematics of an executable memory page validation system in accordance with embodiments of the presently disclosed subject matter. Each module in FIGS. 1 and 2 can be made up of any combination of software, hardware and/or firmware that performs the functions as defined and explained herein. The modules in FIGS. 1 and 2 may be centralized in one location or dispersed over more than one location. In other embodiments of the presently disclosed subject matter, the system may comprise fewer, more, and/or different modules than those shown in FIGS. 1 and 2.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Attention is now drawn to FIG. 1, a schematic illustration of one example of a given endpoint 100, in accordance with the presently disclosed subject matter.

In accordance with the presently disclosed subject matter, endpoint 100 can, optionally, comprise an endpoint network interface 110 that is configured to connect the endpoint 100 to a communication network (being an organizational communication network or any other network, such as the Internet, through which the endpoint can communicate with other computerized devices). The endpoint network interface 110 can be configured to enable the endpoint 100 to send data and receive data sent thereto through the communication network.

Endpoint 100 can further comprise or be otherwise associated with an endpoint data repository 120 (e.g. a database, a storage system, a memory including Read Only Memory—ROM, Random Access Memory—RAM, and/or any other type of memory, etc.) configured to store data, including, inter alia, a plurality of vectors, as further detailed herein with reference to FIG. 2. Each vector can be a bitmask indicative of valid hash values calculated for a plurality of executable memory pages available on the endpoint 100, the valid hash values being calculated using a respective distinct hash function (i.e., each vector is associated with a different hash function). In some cases, endpoint data repository 120 can be further configured to enable retrieval and/or update and/or deletion of the stored data. It is to be noted that in some cases, endpoint data repository 120 can be distributed.

Endpoint 100 can further comprise an endpoint processing resource 130. Endpoint processing resource 130 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant endpoint 100 resources and for enabling operations related to endpoint 100 resources.

Endpoint processing resource 130 can be configured to include an executable memory page validation module 140 for validating one or more executable memory pages on endpoint 100, as detailed further herein, inter alia with reference to FIGS. 2 and 3.

Attention is now drawn to FIG. 2, a schematic illustration of an executable memory page validation system 200 for validating one or more executable memory pages on a given endpoint 100, in accordance with the presently disclosed subject matter.

In accordance with the presently disclosed subject matter, executable memory page validation system 200 can be configured to include executable memory page validation module 140. Executable memory page validation module 140 can be configured to validate one or more executable memory pages on the given endpoint 100 using one or more simple and cheap hash/checksum functions (referred to herein as "hash functions", interchangeably) that map the content of the executable memory pages to one or more validation hash values. The executable memory pages can be validated prior to being loaded to a computerized memory (e.g., RAM) of the endpoint data repository 120 for execution thereof. The hash functions can be at least one of: one or more proprietary algorithms or one or more known checksum functions (e.g., CRC, MD5, SHA1, etc.).

It is known in the art to validate an executable memory page by comparing the executable memory page to be validated to a known valid version of the page. This is performed in most cases by using a cryptographic algorithm to find a digital signature of the executable memory page to be validated or an index to a known valid version (e.g., original version) of the executable memory page to be validated, and by then comparing the content between the executable memory page to be validated and the known valid version of the executable memory page. This operation is quite expensive since it requires the use of expensive crypto algorithms as well as the need to access additional data structures in order to locate the original executable memory page or the digital signature. The present disclosure, by validating executable memory pages using simple and cheap hash functions, enables significantly reducing the processing overhead required to validate executable memory pages.

Executable memory page validation module 140 can be configured to include the following modules: vectors obtaining module 210, hash function calculation module 220 and validation determination module 230.

Vectors obtaining module 210 can be configured to obtain a plurality of vectors 240 (e.g. by retrieving the vectors 240 from the endpoint data repository 120), each vector (e.g., vector 240-*a*, vector 240-*b*, vector 240-*c*, vector 240-*d*) of the vectors 240 being a bitmask indicative of valid hash values calculated for a plurality of executable memory pages available on the given endpoint 100, the valid hash values being calculated using a respective distinct hash function (i.e., each vector is associated with a different hash function). In some cases, the plurality of executable memory pages can be all of the executable memory pages available on the given endpoint 100.

Each vector (e.g., 240-*a*, 240-*b*, 240-*c*, 240-*d*) can be configured to include a plurality of elements associated with possible hash values, including the valid hash values.

In some cases, the number of elements in a given vector (e.g., 240-*a*, 240-*b*, 240-*c*, 240-*d*) can be a multiple (e.g., 8 or 16) of a number of possible executable memory pages on the given endpoint 100. Each element of the given vector (e.g., 240-*a*, 240-*b*, 240-*c*, 240-*d*) can correspond to a possible hash value. Each element of the given vector (e.g., 240-*a*, 240-*b*, 240-*c*, 240-*d*) that corresponds to a valid hash value can be set to a first bit value (e.g., 1 or 0). Conversely, each element of the given vector (e.g., 240-*a*, 240-*b*, 240-*c*, 240-*d*) that does not correspond to a valid hash value can be set to a second bit value (e.g., 0 or 1) opposite to the first bit value (i.e., if a first bit value is '1', the second bit value is '0', and vice versa), thereby indicating that the respective hash value is invalid (i.e. so that if execution of the hash function on a given executable memory page results in such a value—the given executable memory page is indicated as being invalid).

In some cases, the number of elements in a given vector (e.g., 240-*a*, 240-*b*, 240-*c*, 240-*d*) can be a predefined number (i.e., modulus) (for example, 4096). Each element of the given vector (e.g., 240-*a*, 240-*b*, 240-*c*, 240-*d*) can correspond to one or more possible hash values that are associated with a respective modulo of the predefined number. Each element of the given vector (e.g., 240-*a*, 240-*b*, 240-*c*, 240-*d*) that corresponds to a modulo of a valid hash value can be set to a first bit value (e.g., 1 or 0). Conversely, each element of the given vector (e.g., 240-*a*, 240-*b*, 240-*c*, 240-*d*) that does not correspond to a modulo of a valid hash value can be set to a second bit value (e.g., 0 or 1) opposite to the first bit value (i.e., if a first bit value is '1', the second bit value is '0', and vice versa), thereby indicating that the respective hash value is invalid (i.e. so that if execution of the hash function on a given executable memory page results in such a value—the given executable memory page is indicated as being invalid).

An advantage of the present disclosure is that little memory storage is required for storing the vectors 240, since each vector (e.g., 240-*a*, 240-*b*, 240-*c*, 240-*d*) is associated with valid hash values that are calculated for a plurality of executable memory pages available on the given endpoint 100 and not for each individual executable memory page.

It is to be noted that the bitmasks for the vectors 240 that are illustrated in FIG. 2 are provided for illustrative purposes only.

The executable memory pages available on the given endpoint 100 can be generated by: (a) scanning a whole image of a non-volatile memory (e.g., a hard disk drive) associated with the given endpoint 100, (b) identifying all executables on the non-volatile memory, (c) extracting executable code segments of the executables, and (d) cutting the executable code segments into the executable memory pages. The bitmasks of the plurality of vectors 240 can then be generated for a plurality of the executable memory pages prior to validating one or more executable memory pages on the given endpoint 100, the bitmasks being generated in accordance with the valid hash values that are calculated for the plurality of the executable memory pages. Since the bitmasks of the vectors 240 can be generated during image creation, there are no performance considerations associated with the generation of the vectors 240. As a result, valid hash values can be calculated for the plurality of the executable memory pages using a practically unlimited number of different hash functions.

Hash function calculation module 220 can be configured to calculate one or more validation hash values 225 for a given executable memory page that is to be loaded to a computerized memory of the given endpoint 100 for execution thereof, each validation hash value of the validation hash values 225 being calculated using a selected hash function of the distinct hash functions used to calculate the valid hash values, and each validation hash value being calculated using a different selected hash function.

Validation determination module 230 can be configured to determine that the given executable memory page is invalid, upon one or more of the validation hash values 225 calculated for the given executable memory page not being indicated as valid by the corresponding one or more of the vectors 240.

Attention is now drawn to FIG. 3, a flowchart illustrating one example of a sequence of operations performed on a given endpoint 100 for validating a given executable memory page, in accordance with the presently disclosed subject matter.

In the illustrated example, an executable memory page validation module 140 of the given endpoint 100 can be configured to obtain a plurality of vectors 240, using vectors obtaining module 210, each vector (e.g., 240-*a*, 240-*b*, 240-*c*, 240-*d*) of the vectors 240 being a bitmask indicative of valid hash values calculated for a plurality of executable memory pages available on the endpoint 100, the valid hash values being calculated using a respective distinct hash function, as detailed earlier herein, inter alia with reference to FIG. 2 (block 304).

In some cases, the plurality of executable memory pages are all of the executable memory pages available on the given endpoint 100.

Executable memory page validation module 140 can be configured, using hash function calculation module 220, to calculate one or more validation hash values 225 for a given executable memory page to be loaded to a computerized memory of the endpoint 100 for execution thereof, using one or more selected hash functions of the distinct hash functions used to calculate the valid hash values (block 308).

In some cases, the selected hash functions can be a plurality of selected hash functions, thereby decreasing the likelihood that a malicious actor could inject malicious code into a given executable memory page that is not detected by the executable page validation module 140. This is due to the unlikelihood of two executable memory pages being mapped to the same plurality of hash values. In some cases, three, four, or even more selected hash functions can be selected.

In some cases, the one or more selected hash functions can be randomly selected from among the distinct hash functions. Additionally, or alternatively, in some cases, the selected hash functions can be selected in real-time, e.g. at a time of loading of an operating system on the endpoint 100 or when the given executable memory page is being prepared for loading. The random and/or real-time selection of the selected hash functions decreases the likelihood that a malicious actor could inject malicious code into a given executable memory page that is not detected by the executable page validation module 140.

In some cases, endpoint processing resource 130 can be configured to parse the given executable memory page only once for a parallel calculation of a plurality of validation hash values 225 using a corresponding plurality of selected hash functions. In some cases, in which endpoint processing resource 130 is configured to parse the given executable memory page only once for a parallel calculation of a plurality of validation hash values 225, endpoint processing resource 130 can be configured to parse the given executable page by sequentially parsing one or more chunks of the given executable memory page, and the parallel calculation can be performed using a plurality of selected hash functions that are streaming incremental hash functions. By parsing the given executable memory page only once, the given executable memory page can be loaded to a memory cache only once for the performing of the hash function calculations, thereby reducing processing overhead.

In some cases, hash function calculation module 220 can be configured to obtain, from a non-volatile memory (e.g., a hard disk drive), the given executable memory page to be loaded. In some cases, hash function calculation module 220 can be configured to obtain, from a cache memory (e.g., a disk cache memory), the given executable memory page to be loaded.

In some cases, endpoint processing resource 130 can be configured to hook into a paged memory management unit of the endpoint 100 to detect, responsive to a page fault, that a given executable memory page is to be loaded. In this manner, endpoint processing resource 130 can be configured to detect all possible instances in which a given executable memory page is to be loaded, including an executable memory page that is to be loaded from cache memory, thereby enabling detection of executable malicious code that is injected into the executable memory page while the executable memory page is stored in the cache memory or being swapped out by the memory subsystem of the endpoint 100.

Endpoint processing resource 130 can be configured to hook into the paged memory management unit at one of the following levels: an operating system level, a hypervisor level, or a Unified Extensible Firmware Interface (UEFI) level. In some cases, the hook can be performed on a kernel of one of the aforementioned levels.

Executable memory page validation module 140 can be configured to determine that the given executable memory page is invalid, using validation determination module 230, upon one or more of the validation hash values 225 calculated for the given executable memory page not being indicated as valid in one or more of the corresponding vectors 240 (block 312).

In some cases, upon the executable memory page validation module 140 determining that the given executable memory page is invalid, the endpoint processing resource 130 can be configured to alert a user of the endpoint 100.

Additionally, or alternatively, in some cases, upon the executable memory page validation module 140 determining that the given executable memory page is invalid, the endpoint processing resource 130 can be configured to stop the process associated with the given executable memory page from executing.

In addition to alerting a user of the endpoint 100 of the invalidity of a given executable memory page, or as an alternative thereto, in some cases, the endpoint processing resource 130 can be configured to modify the invalid given executable memory page. In some cases, the invalid given executable memory page can be modified by modifying the executable code of the given executable memory page to be no operation (NOP) code. In some cases, assuming that the invalid given executable memory page includes erroneous but not malicious code, endpoint processing resource 130 can be configured to correct the erroneous code (e.g., using error correction code).

It is to be noted that, with reference to FIG. 3, some of the blocks can be integrated into a consolidated block or can be broken down to a few blocks and/or other blocks may be added. It should be also noted that whilst the flow diagrams are described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. An executable memory page validation system for validating one or more executable memory pages on a given endpoint, the executable memory page validation system comprising at least one processing resource configured to:
    obtain a plurality of vectors, each vector of the vectors being a bitmask indicative of valid hash values calculated for a plurality of executable memory pages available on the endpoint, the valid hash values being calculated using a respective distinct hash function;
    calculate one or more validation hash values for a given executable memory page to be loaded to a computerized memory of the endpoint for execution thereof, using one or more selected hash functions of the distinct hash functions; and
    determine that the given executable memory page is invalid, upon one or more of the validation hash values not being indicated as valid in the corresponding one or more vectors.

2. The executable memory page validation system of claim 1, wherein the given executable memory page is to be loaded from a non-volatile memory or from a cache memory.

3. The executable memory page validation system of claim 1, wherein the plurality of executable memory pages are all of the executable memory pages available on the given endpoint.

4. The executable memory page validation system of claim 1, wherein the at least one processing resource is further configured to hook into a paged memory management unit of the endpoint to detect, responsive to a page fault, that the given executable memory page is to be loaded.

5. The executable memory page validation system of claim 4, wherein the hook is performed at: (a) an operating system level, (b) a hypervisor level, or (c) a Unified Extensible Firmware Interface (UEFI) level.

6. The executable memory page validation system of claim 1, wherein the one or more selected hash functions are randomly selected from among the distinct hash functions.

7. The executable memory page validation system of claim 1, wherein the one or more selected hash functions are selected: (a) at a time of loading of an operating system on the endpoint, or (b) when the given executable memory page is being prepared for loading.

8. The executable memory page validation system of claim 1, wherein during the calculate, the at least one processing resource is configured to parse the given executable memory page only once for a parallel calculation of the selected hash functions when a plurality of selected hash functions are selected.

9. The executable memory page validation system of claim 8, wherein the parse is performed by sequentially parsing one or more chunks of the given executable memory page and wherein the selected hash functions are incremental hash functions.

10. The executable memory page validation system of claim 1, wherein, upon determining that the given executable memory page is invalid, the at least one processing resource is configured to: (a) alert a user of the endpoint, (b) modify the given executable memory page, or (c) stop a process associated with the given executable memory page from executing.

11. An executable memory page validation method for validating one or more executable memory pages on a given endpoint, the executable memory page validation method comprising:

obtaining a plurality of vectors, each vector of the vectors being a bitmask indicative of valid hash values calculated for a plurality of executable memory pages available on the endpoint, the valid hash values being calculated using a respective distinct hash function;

calculating one or more validation hash values for a given executable memory page to be loaded to a computerized memory of the endpoint for execution thereof, using one or more selected hash functions of the distinct hash functions; and determining that the given executable memory page is invalid, upon one or more of the validation hash values not being indicated as valid in the corresponding one or more vectors.

12. The executable memory page validation method of claim 11, wherein the given executable memory page is to be loaded from a non-volatile memory or from a cache memory.

13. The executable memory page validation method of claim 11, wherein the plurality of executable memory pages are all of the executable memory pages available on the given endpoint.

14. The executable memory page validation method of claim 11, further comprising:

hooking into a paged memory management unit of the endpoint to detect, responsive to a page fault, that the given executable memory page is to be loaded.

15. The executable memory page validation method of claim 14, wherein the hooking is performed at: (a) an operating system level, (b) a hypervisor level, or (c) a Unified Extensible Firmware Interface (UEFI) level.

16. The executable memory page validation method of claim 11, wherein the one or more selected hash functions are: (a) randomly selected from among the distinct hash functions (b) selected at a time of loading of an operating system on the endpoint, or (c) selected when the given executable memory page is being prepared for loading.

17. The executable memory page validation method of claim 11, wherein the calculating further comprises:

parsing the given executable memory page only once for a parallel calculation of the selected hash functions when a plurality of selected hash functions are selected.

18. The executable memory page validation method of claim 17, wherein the parsing is performed by sequentially parsing one or more chunks of the given executable memory page and wherein the selected hash functions are incremental hash functions.

19. The executable memory page validation method of claim 11, wherein, upon determining that the given executable memory page is invalid, the method further comprises one or more of: (a) alerting a user of the endpoint, (b) modifying the given executable memory page, or (c) stopping a process associated with the given executable memory page from executing.

20. A non-transitory computer readable storage medium having computer readable program code embodied therewith, the computer readable program code, executable by at least one processor of a computer to perform an executable memory page validation method for validating one or more executable memory pages on a given endpoint comprising:

obtaining a plurality of vectors, each vector of the vectors being a bitmask indicative of valid hash values calculated for a plurality of executable memory pages available on the endpoint, the valid hash values being calculated using a respective distinct hash function;

calculating one or more validation hash values for a given executable memory page to be loaded to a computerized memory of the endpoint for execution thereof, using one or more selected hash functions of the distinct hash functions; and determining that the given executable memory page is invalid, upon one or more of the validation hash values not being indicated as valid in the corresponding one or more vectors.

* * * * *